United States Patent [19]
Priest

[11] Patent Number: 5,644,550
[45] Date of Patent: Jul. 1, 1997

[54] METHOD FOR LOGGING BEHIND CASING

[75] Inventor: John F. Priest, Tomball, Tex.

[73] Assignee: Western Atlas International, Inc., Houston, Tex.

[21] Appl. No.: 674,485

[22] Filed: Jul. 2, 1996

[51] Int. Cl.⁶ .................................................. G01V 1/40
[52] U.S. Cl. ........................... 367/35; 367/27; 367/32; 181/105; 364/422
[58] Field of Search ........................... 367/27, 32, 35; 181/105; 364/422

[56] References Cited

U.S. PATENT DOCUMENTS

| | | | |
|---|---|---|---|
| 4,703,427 | 10/1987 | Catala | 364/422 |
| 4,733,380 | 3/1988 | Havira | 367/35 |
| 4,896,303 | 1/1990 | Leslie et al. | 364/422 |
| 4,916,649 | 4/1990 | Gard | 367/25 |
| 5,001,676 | 3/1991 | Broding | 367/31 |
| 5,274,604 | 12/1993 | D'Angelo et al. | 367/35 |

OTHER PUBLICATIONS

Zhou, J.; Well Logging Tech., vol. 19, #2, pp. 97–104, 1995; abst. only herewith.
Sheives et al; 61st Annu. SPE Tech. Conf., Oct. 8, 1986, SPE–15436, 8 pgs; abst. herewith.
Jutter et al, SPE/IAPC Conf., Mar. 18, 1987, pp. 763–772; abst. herewith.

Primary Examiner—Nelson Moskowitz
Attorney, Agent, or Firm—Karen Tripp; Richard A. Fagin

[57] ABSTRACT

A method for logging a subterranean formation from within a well that has been cased and cemented is disclosed. An acoustic signal is transmitted into the formation from a pulse-echo transducer placed within the wellbore and the first casing echo and the first formation echo are detected. The amplitude and the arrival times of these two echoes, combined with some known information about the wellbore, the casing, and the cement enable several parameters to be calculated. These parameters in turn may be used to image the formation around the well.

6 Claims, 7 Drawing Sheets

METHOD FOR LOGGING BEHIND CASING

BACKGROUND OF THE INVENTION

1. Field of the Invention

The present invention is related to the field of logging wellbores with electric wireline tools. More specifically, the present invention is related to the use of acoustic pulse-echo imaging tools in wells which have been cased and cemented. Such tools are run on electric wireline, cable, tubing, or pipe in wellbores to ascertain data, including acoustic reflection properties and acoustic travel times, from which information on geologic formations surrounding the wellbores may be obtained.

2. Description of the Related Art

Acoustic pulse-echo imaging tools are known in the art. For example, "The Digital Circumferential Borehole Imaging Log—CBIL™," Atlas Wireline Services, Houston, Tex. (1993), describes an acoustic pulse-echo imaging tool in detail. The acoustic pulse-echo imaging tool usually comprises a rotating head on which is mounted an acoustic transducer, such as a piezoelectric or bender-type transducer. The transducer periodically emits an acoustic energy pulse on command from a controller circuit in the tool. After emission of the acoustic energy pulse, the transducer can be connected to a receiving circuit, generally located in the tool, for measuring a returning echo of the previously emitted acoustic pulse which is reflected off the wellbore wall. Circuitry, which can be in the tool or at the earth's surface, measures the echo or reflection travel time and the reflection amplitude. The measurements of reflection time and reflection amplitude are used by circuitry at the earth's surface to generate graphs or images which correspond to the visual appearance, structure or other properties of the wellbore wall. The graph is used, for example, to measure the attitude of sedimentary features and to locate breaks or fractures in some earth formations in wellbores without casing. Measurements from acoustic pulse-echo imaging tools may also be used to derive the thickness of casing in wellbores with casing, as discussed in U.S. Pat. No. 5,491,668, issued Feb. 13, 1996, to John F. Priest and assigned to Western Atlas International, Inc.

Generally, however, logging behind casing, and ascertaining the type of information about a formation that is available from logging uncased wells, has not been available for wells with casing. Casing is installed on at least a portion of most completed wellbores and is most commonly used for hydraulically isolating an earth formation that could be damaged or contaminated by fluids which may be produced from a different earth formation penetrated by the wellbore. A fill material, typically referred to as, and comprising, concrete or cement, installed in the annulus portion of the wellbore between the casing and the earth formation, further prevents migration of fluids from one zone to another, and is particularly useful in separating oil and gas producing layers from each other and from water bearing strata.

Removing casing and concrete for logging is avoided because doing so may damage the well and, if the well is in production, requires taking the well out of production and risking the need of a workover of the well prior to resuming production again. Unfortunately, a large number of wells were drilled and cased worldwide prior to the advent of high resolution imaging tools, such as acoustic imaging systems, and thus information that these tools can detect about a formation does not exist for those wells. Of particular interest are thin bed sequences of sands and shales or fractures which were generally not detected by earlier instruments. Such sequences may show the presence of producing zones which were missed by the earlier technology wellbore test probes. However, drilling new test wells is costly, and may not result in sufficient new production to pay for the cost of the drilling. There is accordingly a need for logging behind casing and behind casing imaging.

Most currently known work in behind casing acoustics has been at long wavelengths, which cannot adequately describe the position, depth and character of features in the vicinity of the wellbore. Little work has been done in trying to use high frequency signals in behind casing logging, because of the improbability of recovering usable signals. High frequency signals generate massive amounts of data, and multiple reflecting surfaces in turn generate multiple reflections. The prospects of obtaining usable signals in such a situation were apparently considered to be too improbable to merit serious consideration.

U.S. Pat. No. 5,274,604, issued Dec. 28, 1993 to Ralph M. D'Angelo, et al. and assigned to Schlumberger Technology Corp., reports that, in general, any acoustic measurement used on a casing-cement-formation system will result in received energy which is dominated by casing reflections. That patent describes a method for partially filtering signals representing formation and channel echoes in a borehole environment to characterize channels formed between the material just outside the casing and the material beyond that. The filtered signals are said to indicate the quality of isolation achieved by the fill material or cement outside the casing and to provide a measurement of the thickness of the fill material. No suggestion is made of trying to find or use any signals to log formations behind casing.

A need accordingly still exists for a method of logging formations behind casing to ascertain features of the formations and particularly to identify narrow producing zones that were missed prior to installation of casing.

SUMMARY OF THE INVENTION

The invention in a general aspect comprises a system for obtaining data on a subterranean formation from within a well that has been cased and cemented, and without removal of the casing or the cement. In a more specific aspect, an acoustic pulse signal is transmitted into a formation from a pulse-echo transducer placed within the wellbore, and at an angle approximately perpendicular to the wellbore. At the interface between the interior of the well and the casing, the signal is partially reflected back to the transducer where it is detected as the first casing reflection (also called an echo). The remainder of the signal not reflected back travels into the casing, where some of the signal is absorbed by the casing resonance and the remainder of the signal travels on to the interface of the casing and the fill material. The fill material is typically cement. Once again, at the interface of the casing and fill material, some of the signal is reflected back towards the transducer while the remainder continues on to the interface of the fill material and the formation. At this latter interface, some of the signal is reflected back towards the transducer and the remainder continues on into the formation. The portion of this signal reflected from the fill material/formation interface, that reaches the transducer is the first formation reflection, or echo.

It has been found that, even though numerous reflections or echoes are being fed to the transducer, detection of the first casing reflection and the first formation reflection is relatively straight forward, and it has been further found that the amplitude and arrival times of these two reflections, combined with some known information about the wellbore, the casing, and the fill material, enable several parameters to be calculated. These parameters include the casing inner radius, the casing thickness, the concrete thickness and the formation reflectance amplitude. The formation reflectance amplitude may then be used to image the formation or formations around the well.

DESCRIPTION OF A PREFERRED EMBODIMENT

Figure 1:
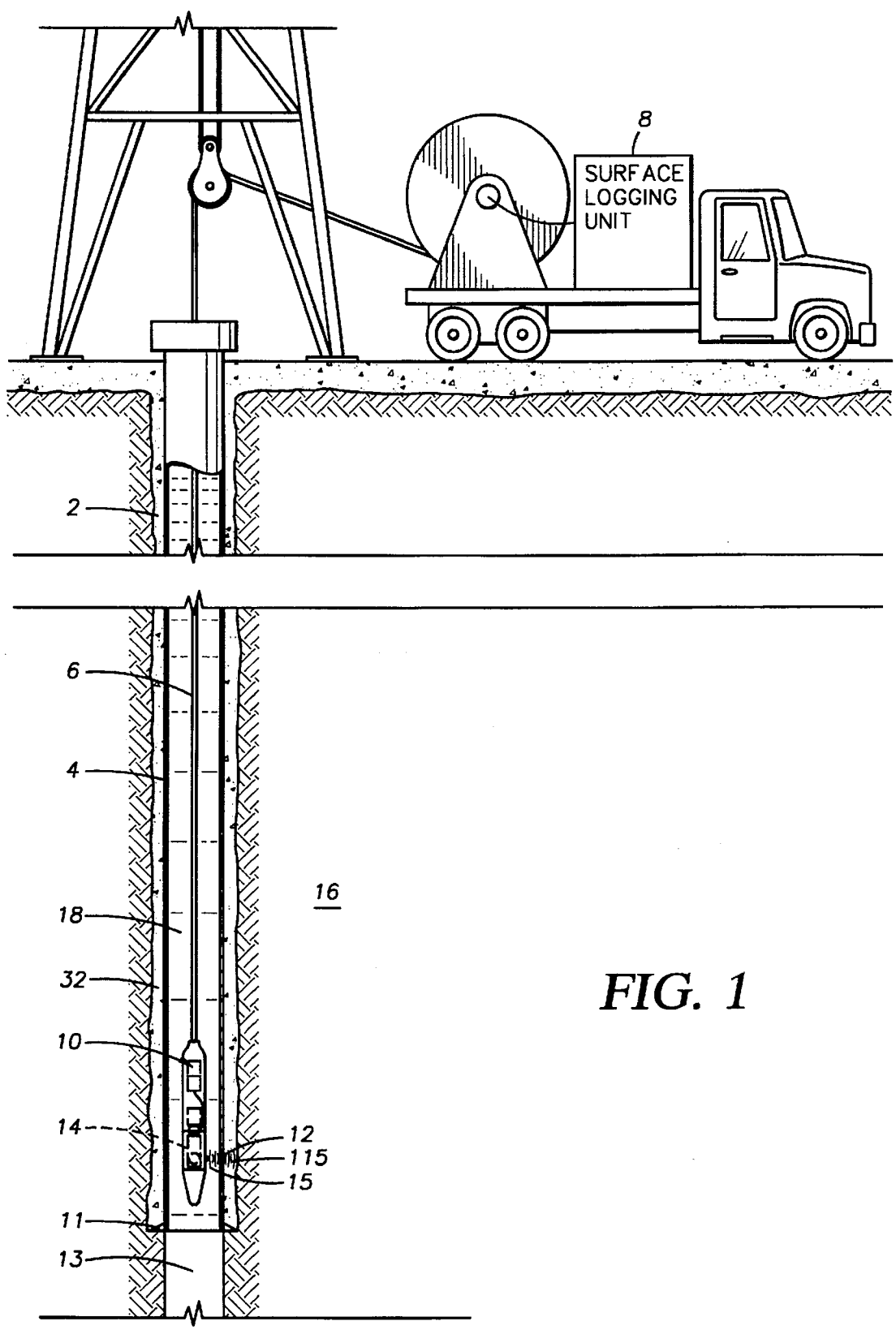
FIG. 1 depicts an acoustic pulse-echo imaging tool as deployed within a cased well.

FIG. 1 shows an acoustic pulse-echo imaging tool 10 positioned in a wellbore 2 completed with casing 4 cemented in place with fill material such as concrete or cement 32. The acoustic pulse-echo imaging tool 10, called the "tool" for brevity, is lowered to a desired depth in the wellbore 2 by means of an electric wireline, pipe, tubing, cable or other suitable support member 6. Power to operate the tool 10 may be supplied by a surface logging unit 8 connected to the other end of the support member 6. Signals acquired by the tool 10 are transmitted through the support member 6 to the surface logging unit 8 for processing and presentation. Alternatively, at least some signals may be processed with equipment within the well.

The tool 10 has a transducer section 14 from which an acoustic pulse 12 is emitted. The acoustic pulse 12 travels through a fluid 18 which fills the portion of the wellbore 2 inside the casing 4. The fluid 18 may be typical well fluids such as water, a water-based solution of appropriate chemicals, drilling mud, etc. After emission of the acoustic pulse 12, the transducer section 14 is switched to receive the reflection 15 of the acoustic pulse 12 from the wall of the wellbore 2, or from the casing 4. When the acoustic pulse 12 strikes the casing 4, at least part of the energy in the acoustic pulse 12 is reflected back toward the tool 10 as a casing reflection (or echo) 15. The remainder of the signal continues on toward the concrete formation interface—where at least part of the energy in the acoustic pulse 12 is reflected back toward the tool 10 as a formation reflection (or echo) 115. The casing and formation reflections (or echoes) 15 and 115 contain data useful in the method of this invention.

Figure 2:
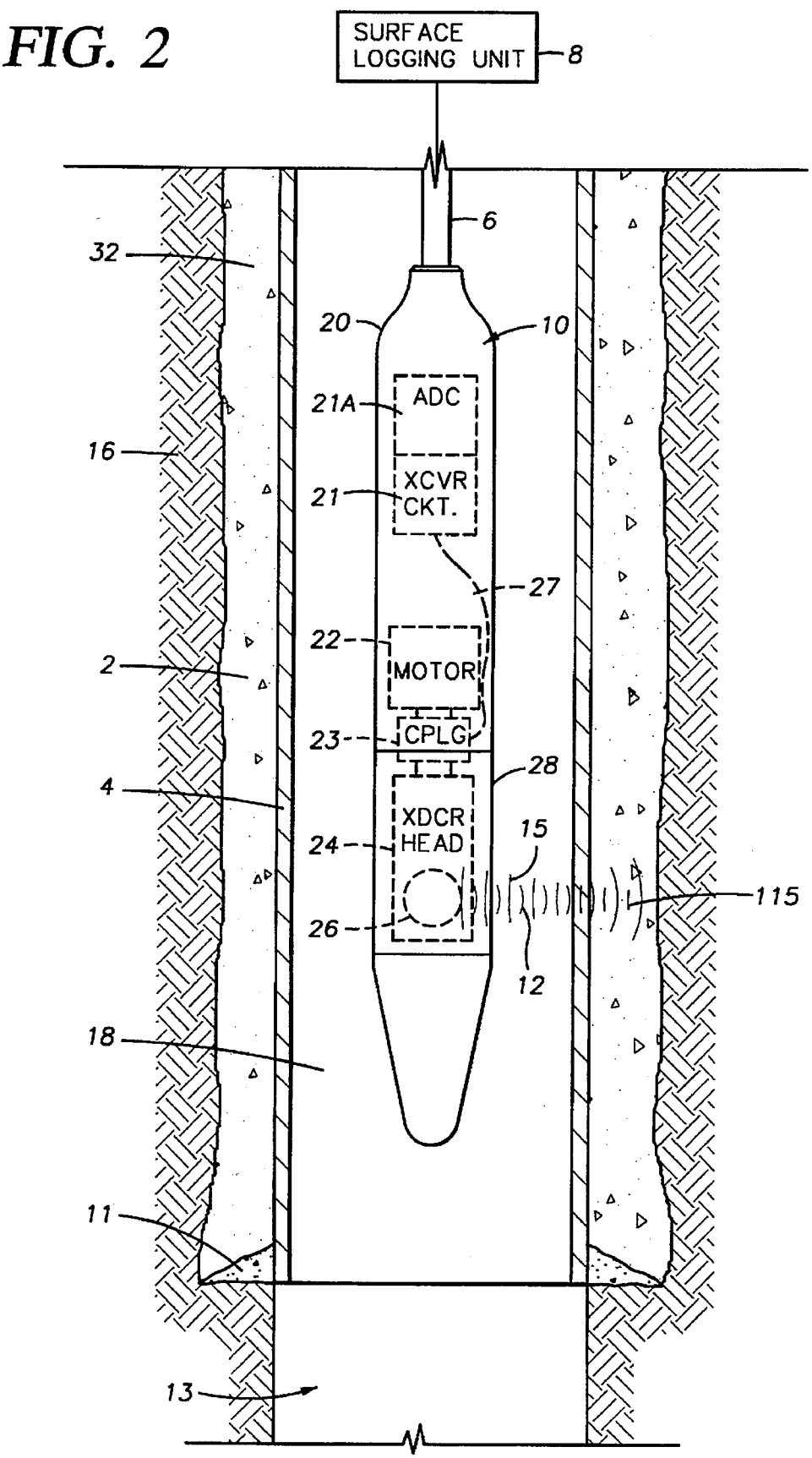
FIG. 2 shows the acoustic pulse-echo imaging tool in more detail.

FIG. 2 shows the tool 10 in more detail. The tool 10 is connected to one end of the support member 6 and comprises a housing 20 which contains a transducer head 24 rotated by an electric motor 22. Rotation of the transducer head 24 enables evaluation of substantially all of the circumference of the casing 4 and wellbore 2 by enabling acoustic pulses 12 to be aimed at and reflections 15 and 115 received from various angular positions, especially perpendicular positions, around the axis of the casing 4 or wellbore 2. That is, acoustic pulses and reflections traveling in a perpendicular direction with respect to the tool and the wellbore are the signals of interest for the purposes of this invention. An array transducer with multiple emitters rather than a rotating transducer with a single emitter may also be used. Multiple transducers may also be used.

The transducer head 24 is located within an acoustically transparent cell 28. The acoustic pulses 12 and the reflections 15 and 115 can easily pass through the cell 28. The acoustic pulses 12 are generated, and the reflections 15 and 115 are received by a piezoelectric element 26 contained within the transducer head. The piezoelectric element 26 may have any suitable configuration—rectilinear, conical, biconical, curved, etc. — provided that it is constructed with an internal flowing feature so that the emitted acoustic pulses 12 have an extremely narrow beam width, preferably typically about ⅓ of an inch. Narrow beam width helps to enable high resolution of small features in the cement 32 and in the formation 16. The pulse frequency of the acoustic pulse 12 will be preferably in the range of about 125 kilohertz to about 2 ½ megahertz and most preferably about 250 kilohertz. Generally, a very high frequency pulse echo transducer is needed, such as is available for example in the USI™ ultrasonic imager tool of Schlumberger Technology Corporation, or the ultrasonic transfer must contain significant energy at the casing resonance so that a group delay calculation may be made as taught in U.S. Pat. No. 5,491,668 to John F. Priest. High frequency allows for easier damping which in turn controls pulse length and enables shorter pulse length. For this invention, the pulse length is preferably no longer than about 3 to 5 wavelengths and is most preferably less than about 3 to 5 wavelengths. The pulse length needs to be small enough for differentiation in the reflections.

The piezoelectric element 26 emits acoustic pulses 12 upon being energized by electrical impulses from a transceiver circuit 21. The electrical impulses are conducted through an electromagnetic coupling 23 which enables rotation of the transducer head 24. After transmitting the acoustic pulse 12, the transceiver circuit 21 is programmed to receive a time-varying electrical voltage 27 generated by the piezoelectric element 26 as a result of the reflections 15 and 115 striking the piezoelectric element 26. The transceiver circuit 21 also comprises an analog-to-digital converter which converts the resulting time-varying electrical voltage 27 into a plurality of numbers, which may also be known as samples, representing the magnitude of the time-varying electrical voltage 27 sampled at spaced-apart time intervals. The plurality of numbers is transmitted to the surface logging unit 8 through the support member 6. The tool may also typically send up-hole a digitized wave form once per revolution of its rotating acoustic transducer assembly, which is useful in maintaining and controlling the position of the tool.

A tool 10 that is of particular usefulness in this invention is the acoustic sonde described and claimed in U.S. patent application Ser. No. 08/562,299 entitled "Method and Apparatus for Beam Steering and Bessel Shading of Conformal Array," of John F. Priest, Mathew G. Schmidt and Paul G. Junghans, filed Nov. 22, 1995, as a continuation of U.S. patent application Ser. No. 08/216,648, filed Mar. 22, 1994 now abandoned. That acoustic sonde may be positioned in a wellbore to transmit acoustic pulses in a perpendicular direction with respect to the tool and the wellbore, to the casing 4 and formation 16 and to receive back reflections from the casing 4 and formation 16 in a perpendicular direction. Description of this acoustic sonde as set forth in that patent application is incorporated herein by reference.

Figure 3A:
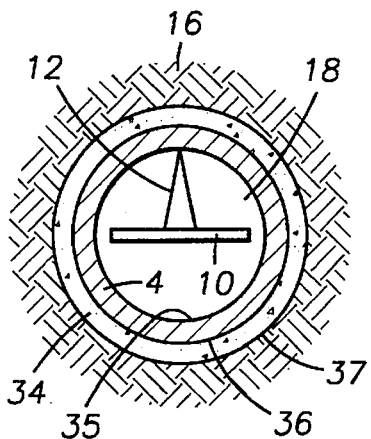
FIGS. 3a–3u illustrate representative signal reflection patterns resulting from operation of the acoustic pulse-echo imaging tool as it is used in this invention.

FIGS. 3a–3u show the principle of operation of tool 10 in more detail as it relates to logging the formation 16 behind the casing 4. More specifically, FIGS. 3a–3u are representative of patterns that a pulse signal and its various reflections may take. Although reflections 15 and 115 are discussed above as single reflections from the casing and formation for illustration, each pulse signal actually is reflected complexly, with multiple reflections from the well fluid/casing interface, the casing/concrete interface, the concrete formation interface, and geologic features within the formation. Other patterns not shown are possible and do occur, as will be readily understood by one skilled in the art of acoustics. Note that all transmissions of acoustic pulses, emitted by the tool 10, and all reflections of those pulses, are shown in FIGS. 3a–3u to be spatially separated so that they might be individually seen. In actual application, these acoustic signals—the pulses and reflections—overlap in the same space. Moreover, for the method of this invention, the pulses transmitted in at least an approximately perpendicular direction to the borehole and reflections received back at the transducer at least an approximately perpendicular angle from the borehole are preferred. Such perpendicular angle avoids the reflections from the casing arriving at the transducer at times that will hide the formation reflections.

Referring to FIGS. 3a–3u, and particularly FIG. 3a, the tool 10 is suspended substantially in the center of the wellbore 2. An acoustic pulse 12 emitted by the tool 10 travels through the fluid 18 filling the wellbore inside the casing 4 until it contacts the casing 4. Because the density and the acoustic velocity of sound (called acoustic velocity of brevity) in the casing 4 and the fluid 18 are generally quite different, an acoustic impedance boundary is created at the interface 35 between the casing 4 and the fluid 18. Some of the energy in the acoustic pulse 12 is reflected back toward the tool 10. At the tool 10, some of the signal enters the piezoelectric element 26 where it is detected as the first casing reflection (or echo), as shown in FIG. 3a, and some of the signal is reflected back toward the casing 4, where it may be further reflected as shown for examples in FIGS. 3b, 3c and 3d.

Figure 3B:
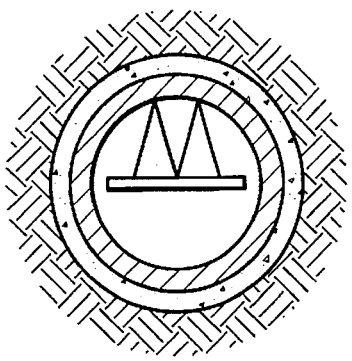
Figure 3C:
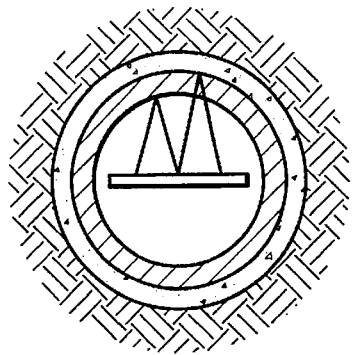
Figure 3D:
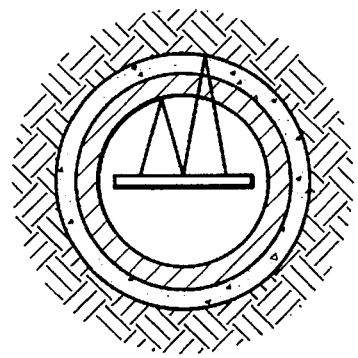
Figure 3E:
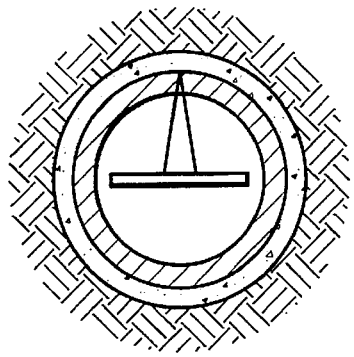

Some of the energy of the acoustic pulse 12 not reflected at the interface 35 travels into the casing 4 and is trapped there due to the casing 4 resonance, while the remainder of the energy of the acoustic pulse travels through the casing 4 until it reaches the interface 36 between the casing 4 and concrete 34 in the annular space between the borehole 2 and the casing 4. The density and acoustic velocity of the concrete 34 and the density and acoustic velocity of the casing 4 are generally different, so another impedance boundary is created. As at the fluid/casing interface 35, some of the energy of the acoustic pulse 12 is reflected back towards the tool 10 as shown in FIG. 3e, where it may undergo a further reflection when it reaches the interface 35 between the casing 4 and the fluid 18 as shown for example in FIGS. 3g and 3h. When the reflected signal reaches tool 10, as shown for example in FIG. 3e, some will enter the transducer head and some will be reflected back toward the casing 4, as shown for example in FIGS. 3i, 3j and 3k. The signal that enters the transducer, as shown in FIG. 3e, may or may not be detectable depending on the frequency of the acoustic pulse 12. For example, a reflection from the casing-concrete interface of an acoustic pulse at about 250 kilohertz will likely be mixed in or hidden with the first casing reflection. However, a reflection from the casing-concrete interface of an acoustic pulse at about 2 ½ megahertz will likely be detectable as separate and following the first casing reflection, before the formation reflection.

Figure 3F:
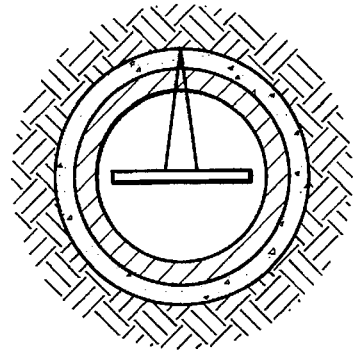
Figure 3G:
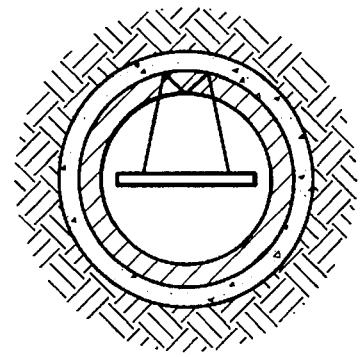
Figure 3H:
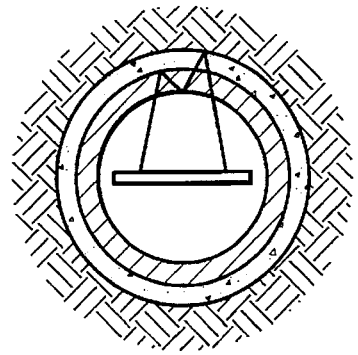
Figure 3I:
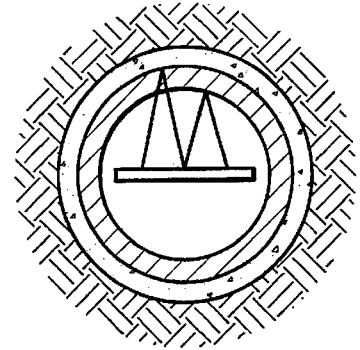
Figure 3J:
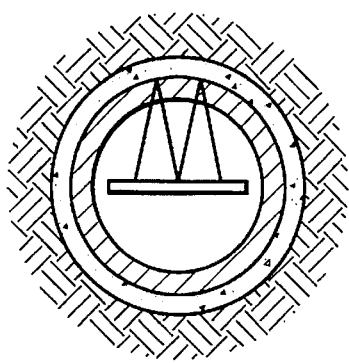
Figure 3K:
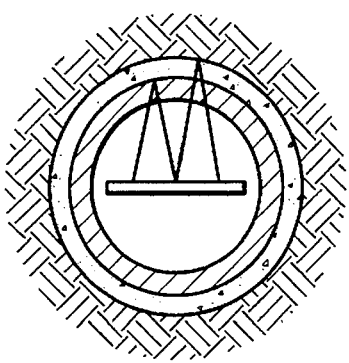

Energy not reflected back at the casing/concrete interface 36 continues to travel through the concrete 34 until it reaches the interface 37 between the concrete 34 and the formation 16 as shown in FIG. 3f. The densities and acoustic velocities of the concrete 34 and the formation 16 are generally different, so still another impedance boundary or interface 37 is created for the energy of the acoustic pulse 12 continuing to this point. As at the fluid/casing interface 35 and the casing/concrete interface 36, some of the energy is reflected back towards the tool 10 as a formation reflection or echo, as shown for example in FIG. 3f, and some of the energy travels into the formation 16.

Figure 3L:
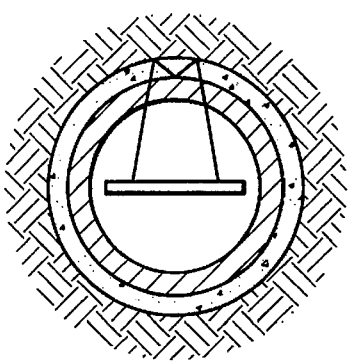
Figure 3M:
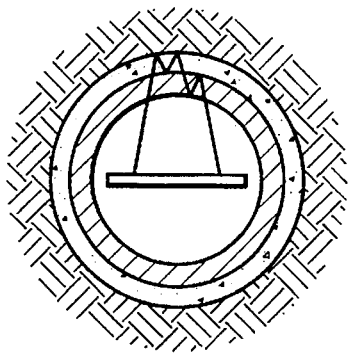
Figure 3N:
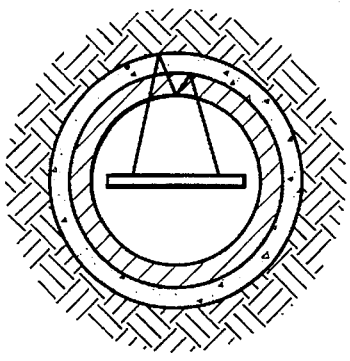
Figure 3O:
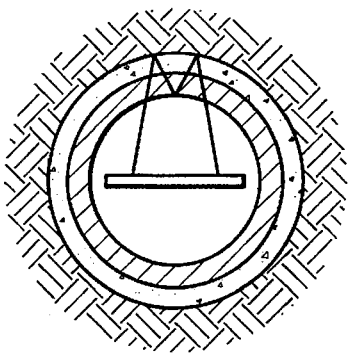
Figure 3P:
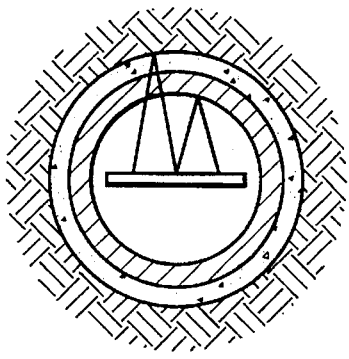
Figure 3Q:
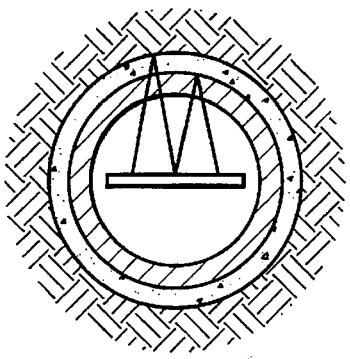
Figure 3R:
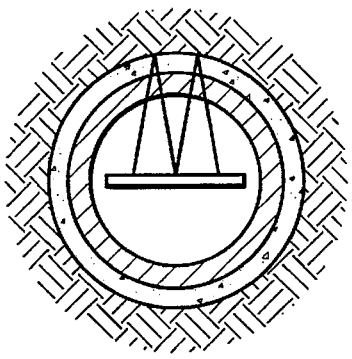

Some of this reflected signal from the formation 16 will undergo a further partial reflection when it reaches the interface 36 between the concrete 34 and the casing 4, as shown for example in FIGS. 3m and 3l with the remainder continuing to travel toward the tool 10, as shown for example in FIG. 3f. Some of this energy will become absorbed in the casing and that continuing on may undergo still another partial reflection when it reaches the interface 35 between the casing and the wellbore fluid, as shown, for example, in FIGS. 3m, 3n and 3o. Of the reflected signal which reaches tool 10, some of the energy will enter the piezoelectric element 26 in the transducer head 24, as shown for example in FIG. 3f—the first formation reflection. The rest of the signal is reflected back to the casing 4, as shown for example in FIGS. 3p, 3q and 3r.

The second casing reflection, as shown in FIG. 3b is detected at the transducer after the first formation reflection shown in FIG. 3f. Part of this energy is further reflected towards the borehole formation wall and the fluid/casing interface 35, or the casing/concrete interface 36, or the concrete/formation interface 37 as shown, for example, in FIGS. 3s, 3u and 3t.

Figure 4:
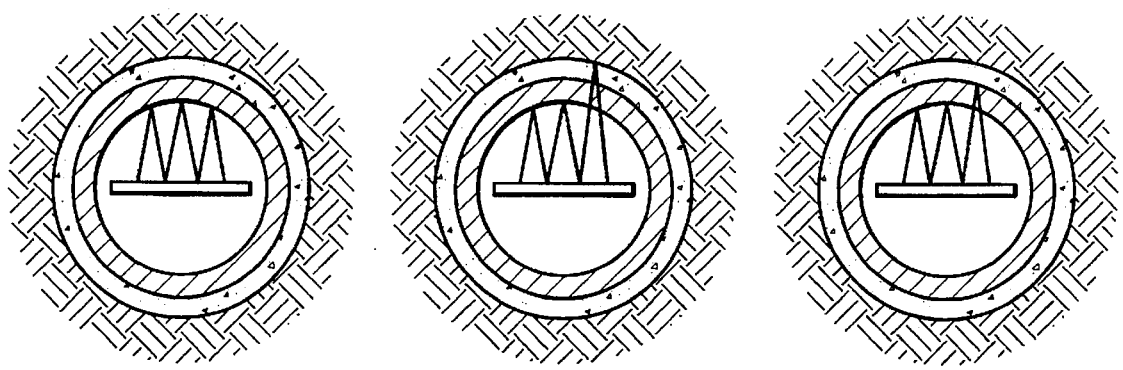
FIG. 4 is a record of a first casing reflection, first formation reflection and second casing reflection of an acoustic pulse transmitted from an acoustic-pulse-echo imaging tool located within a cased well.
Figure 4:
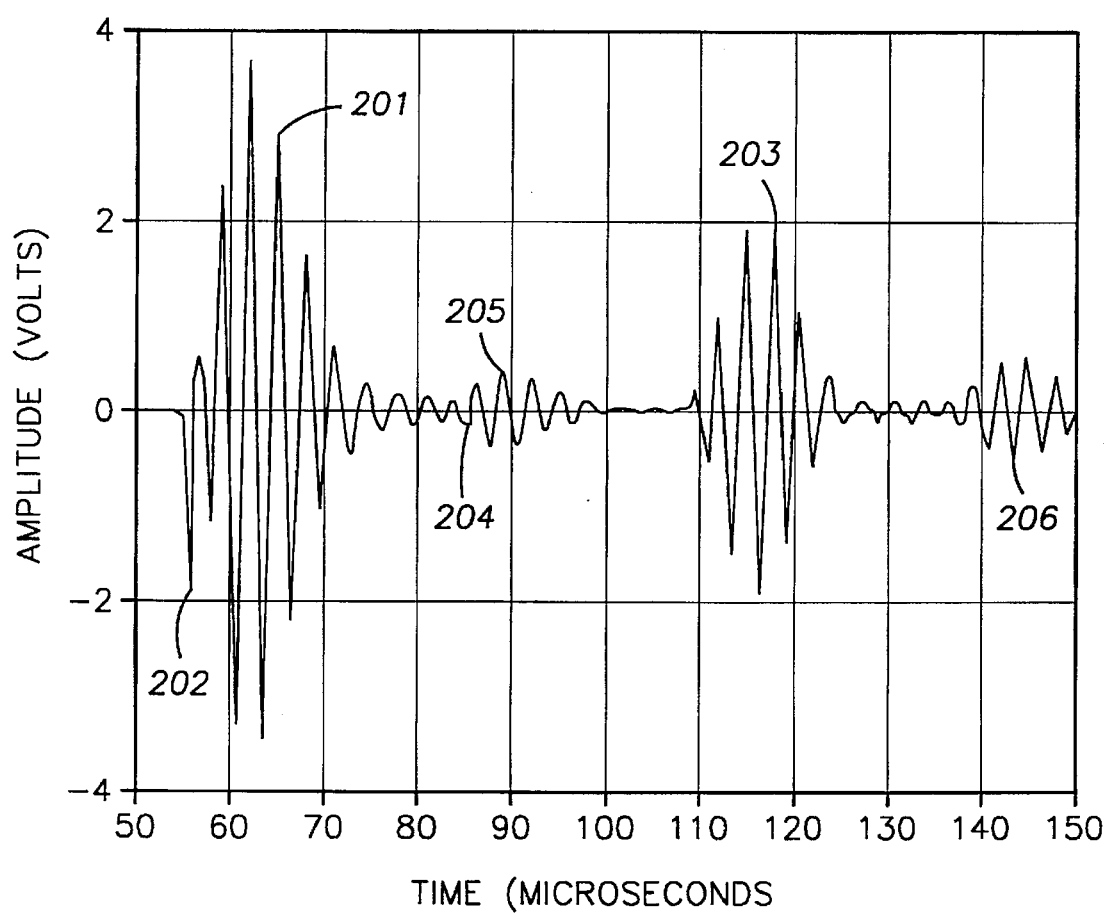

FIG. 4 is a graphic representation of some of the casing reflections of FIGS. 3a–3u. The first casing reflection or echo 201 in FIG. 4, whose reflection pattern is shown in FIG. 3a, occurs when the acoustic signal first impinges on the casing 4 and is reflected back to the piezoelectric element 26 in the transducer head 24 of the tool 10. At the transducer head 24, some of the energy excites the piezoelectric element 26, allowing detection of the pulse-echo, and some of the energy is reflected back into the wellbore. This reflection from the transducer then travels back to the casing, where it may be reflected again and detected, as a second casing reflection as shown in FIG. 3b, or where it may continue on to the casing/concrete interface 36 or the concrete formation interface 37 and be reflected as shown for example in FIGS. 3c and 3d.

FIG. 4 shows the earliest arrival time 202 of casing reflection (or echo) 201, whose reflection pattern is shown in FIG. 3a, and the detection of the second casing reflection (or echo) 203, whose reflection pattern is shown in FIG. 3b. The detection of the first formation reflection (or echo) 205, whose reflection pattern is shown in FIG. 3f, and its earliest arrival time 204 are also shown in FIG. 4. Lastly, the detection of the second formation reflection 206, whose pattern is shown in FIG. 3d, is shown in FIG. 4. In FIG. 4, the reflection from the casing/concrete interface—the reflection represented in FIG. 3e—is hidden within the first casing reflection 201 and cannot be detected separately. For obtaining the data shown in FIG. 4, the acoustic pulse had a frequency of about 250 kilohertz.

The times of the various reflections will change depending on the borehole diameter, casing and concrete thickness, and speed of sound. Conditions should also be suitable for detecting signals, as known to those skilled in the art. For example, high mud attenuation is expected to make signal detection difficult. Reflections may be distinguished from each other by various known methods, such as stacking, deconvolution and spatial filtering, if they are not already distinguishable by differences in times of arrival. The reflections of primary importance for the method of this invention are the first casing reflection 201 and the first formation reflection 205. This information is needed for computation of the casing inner radius, the casing thickness, the concrete thickness and the formation amplitude, which together will provide the type of information about the formation that has traditionally been available when logging wellbores without casing. With this information, the behind casing imaging of this invention may then be accomplished in a manner similar to imaging a wellbore without casing.

The time of the first arrival of the first casing reflection minus the first arrival time of the first formation reflection gives the total time of transit through the casing and concrete to the formation and back to the fluid/casing interface 35. The casing thickness may be calculated by known methods, including the method described and claimed in U.S. Pat. No. 5,491,668 to John F. Priest, issued Feb. 13, 1996, which is incorporated herein by reference. Using the method of U.S. Pat. No. 5,491,668, the casing thickness is calculated by determining the casing resonance frequency using a pair of Fast Fourier Transforms (FFT) to compute the group delay. The frequency ($f_k$) of the group delay local maximum, near the center of the transducer bandwidth, with the speed of sound ($V_{cas}$) in the casing determines the casing thickness:

$$T_{cas} = \frac{2V_{cas}}{f_k}, \quad (1)$$

$$\left\{ f_k | f_k \text{ maximizes} \left( \frac{-2\pi \, \mathbb{R}( \mathcal{F}(x_i)_k \, \mathcal{F}(ix_i)_k^*)}{N \, \mathcal{F}(x_i)_k \, \mathcal{F}(x_i)_k^*} \right) \right\}$$

where $f_k$ is the frequency which maximizes the group delay over the interval near the maximum of the Fourier transform $\mathcal{F}$ of the digitized wave form data $x_i$, N is the number of data points in the Fourier transform, and is on the order of 128 to 512, the asterisk implies the complex conjugate and the $\mathbb{R}$ implies the real part of the complex numbers. The factor two arises because the first casing resonance occurs when the casing thickness is equal to one-half the wavelength of the ultrasonic wave. Another method of calculating casing thickness is discussed in the 1995 IEEE Ultrasonics Symposium article by A. J. Hayman, P. Parent, G. Rouault, S. Zurquiyah and P. Verges, entitled "Quantitative Corrosion Evaluation In Wells Using A Multi-Function Ultrasonic Imager," at pages 1115–1120.

Using the casing thickness, and the speed of sound in the casing and the concrete which are known parameters for concrete and materials comprising the casing, from the transit time ($t_2-t_1$) in the concrete fill material the concrete thickness can be computed by the following formula:

$$T_{con} = \frac{V_{con}}{\left(\frac{t_2-t_1}{2}\right) - \left(\frac{T_{cas}}{V_{cas}}\right)} \quad (2)$$

where $V_{con}$ is the speed of sound in concrete, $t_1$ and $t_2$ are the respective arrival times of the first casing and first formation reflections, or echoes, $T_{cas}$ is the casing thickness, and $V_{con}$ and $V_{cas}$ are the speeds of sound in concrete and casing respectively. The fraction "½" takes into account the bidirectional transit of the signal through the casing and concrete.

The casing inner radius can be calculated using the time to the first arrival of the casing reflection at the transducer and the peak or center of energy calculations. The Western Atlas CBIL#, for example, estimates the first arrival time by measuring the first signal which crosses a fixed threshold. The first arrival time is directly related to the inner radius by the following equation:

$$r_{id} = \frac{V_{fluid}}{\left(\frac{t_1}{2} - \delta t\right)} + r_o \quad (3)$$

where $V_{fluid}$ is the velocity of the acoustic pulse in the wellbore fluid, a known parameter for the particular fluid, $t_1$ is the two way travel time from the transducer to the casing and back, $\delta t$ is a tool calibration parameter related to time delays within the tool and known for the particular tool, and $r_o$ is a known factor for the tool that is applied if the transducer is not coincident with the axis of the tool. The radius from the center of the tool to the transducer front surface, $r_{id}$, is computed using the casing inner radius, $r_{id}$, plus the casing thickness, $T_{cas}$, $$r_{od} = r_{id} + T_{cas}; \quad (4)$$

The formation radius, $r_f$, may be calculated by adding the concrete thickness $T_{con}$, to the casing outer radius, $r_{od}$.

$$r_f = r_{od} + T_{con} \quad (5)$$

Where the concrete thickness is estimated or calculated by equation (2), the formation radius may be calculated from the following formula:

$$r_f = \frac{V_{fluid}}{\left(\frac{t_1}{2} - \delta t\right)} + r_o + T_{cas} + \frac{V_{con}}{\left(\frac{t_2-t_1}{2}\right) - \left(\frac{T_{cas}}{V_{cas}}\right)} \quad (6)$$

where the terms are defined as indicated above.

To estimate the formation reflectance amplitude, the peak of the first formation reflection should be determined. The peak of the first formation reflection can be determined by finding the maximum positive or negative voltage or by rectifying and filtering the signal by well known techniques to determine the formation amplitude.

Given the attenuation in the wellbore fluid and fill material (concrete), and the impedance of the wellbore fluid, casing and fill material, the measured formation reflectance amplitude may be corrected for the given attenuations and impedances to replicate the amplitude that would otherwise be expected in the wellbore without casing.

Figure 5:
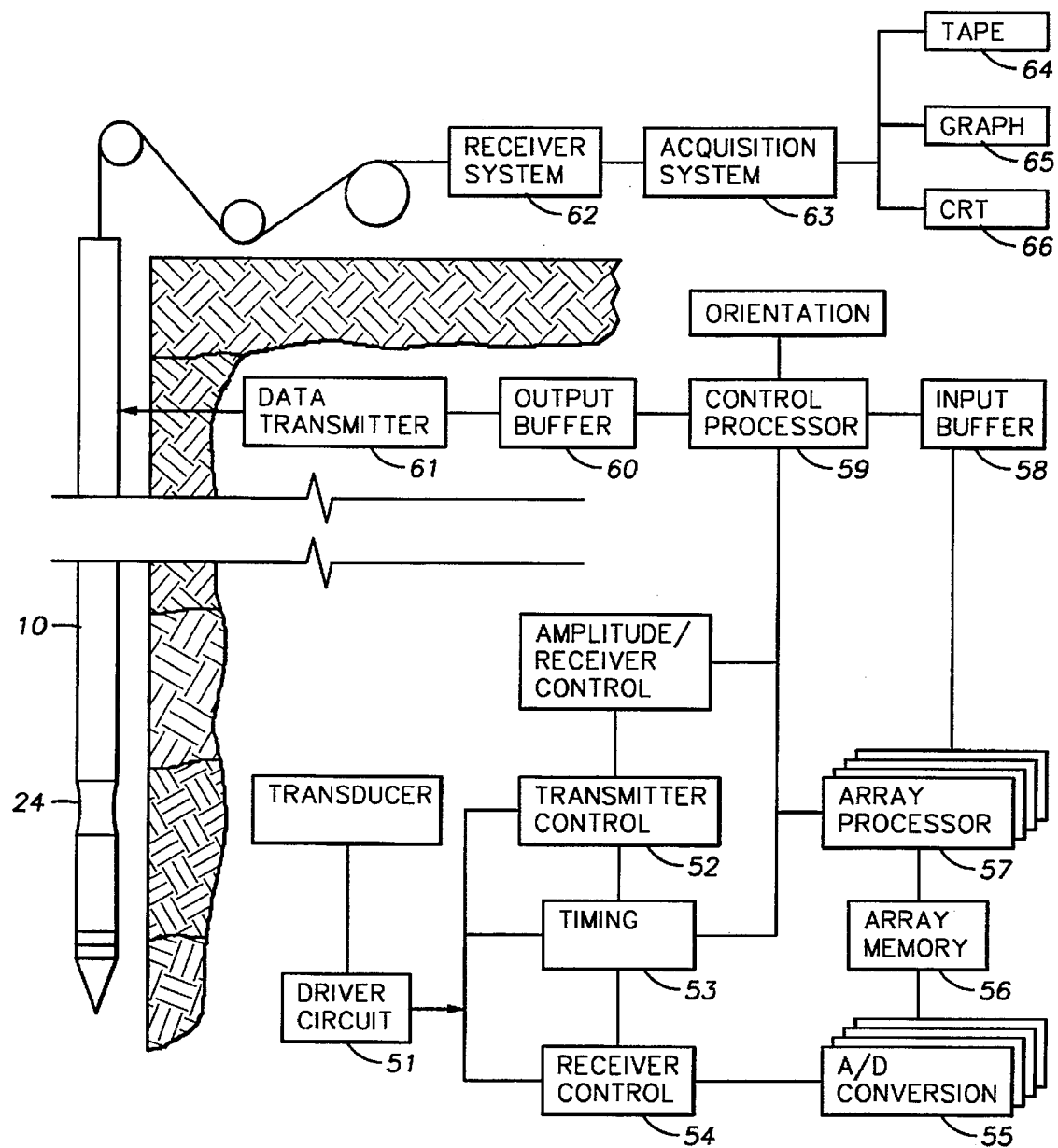
FIG. 5 is a block diagram of an entire acquisition system used in an embodiment of this invention.

FIG. 5 is a block diagram of an acquisition system of this invention, including down hole electronics, which is particularly useful for accomplishing the method of this invention. Driver circuit 51 connects to transmitter control 52 and timing section 53 and provides the drive voltages and signal shaping for excitation of the transducer head 24 in tool 10. The transmitter control 52 determines the output voltage and pulse widths for the drive electronics. The timing section 53 provides the timing information for the fire pulse excitation, the blanking timing to prevent saturation of the receiver control section 54 during the fire pulse, the timing for the receiver control section 54, and analog to digital (A/D) conversion 55 of received data. The receiver control section 54 controls the amplifier gain, and the threshold level for detecting the start of the first casing arrival reflection or echo. The receiver/control section 54 also amplifies the input signal and measures the acquisition time of the first arrival reflection or echo relative to the fire pulse. The A/D converter 55 (which may comprise more than one converter) converts the analog signals received by the receiver/control section 54 and stores the data in the array memory 56. The array processors 57, each of which may be identical, each operate upon one of the stored data sets to calculate the casing inner radius, casing thickness, concrete thickness, formation radius, and formation reflectance amplitude. Sufficient array processors 57 should preferably be included to allow real time computation of the measured results. The outputs of the array processors 57 are stored in the input buffer 58 to the control processor 59. The control processor 59 reads the input buffer 58, performs any remaining processing such as telemetry control, data packing and compression, and transfers the data to the output buffer 60. The output data is taken from the output buffer 60 and transmitted to the surface by the data transmit section 61. This processing of data in the system downhole is conducted downhole for speed. As faster telemetry systems are developed, the processing could occur above ground. Data is received by the receiver system 62, transferred to the acquisition system 63 where the data is stored to tape 64 and may be displayed on computer terminals (CRT) 66 or on graphical plotters 65.

For improved results with this invention, sufficient angular resolution to produce high resolution images is important. About 128 to 256 or more full waveforms per revolution of the transducer are preferred. A typical full waveform is shown in FIG. 4. For example, a system logging at 10 ft/min., 36 rotations of the transducer per foot (6 revolutions per second), firing 256 times per revolution, and digitizing 512 samples per firing, may typically be used for this invention to obtain high resolution images. For such a system, however, it is desirous to process 786,432 words per second (or 1,572,864 bytes per second) of information and calculate 512 Fast Fourier Transforms (FFT's) per revolution of the transducer (3,072 FFT's per second), as taught in U.S. Pat. No. 5,491,668 to John F. Priest for determining casing thickness. That is, enough telemetry to process the information at the surface or enough processing power to process the information downhole is needed.

Figure 6:
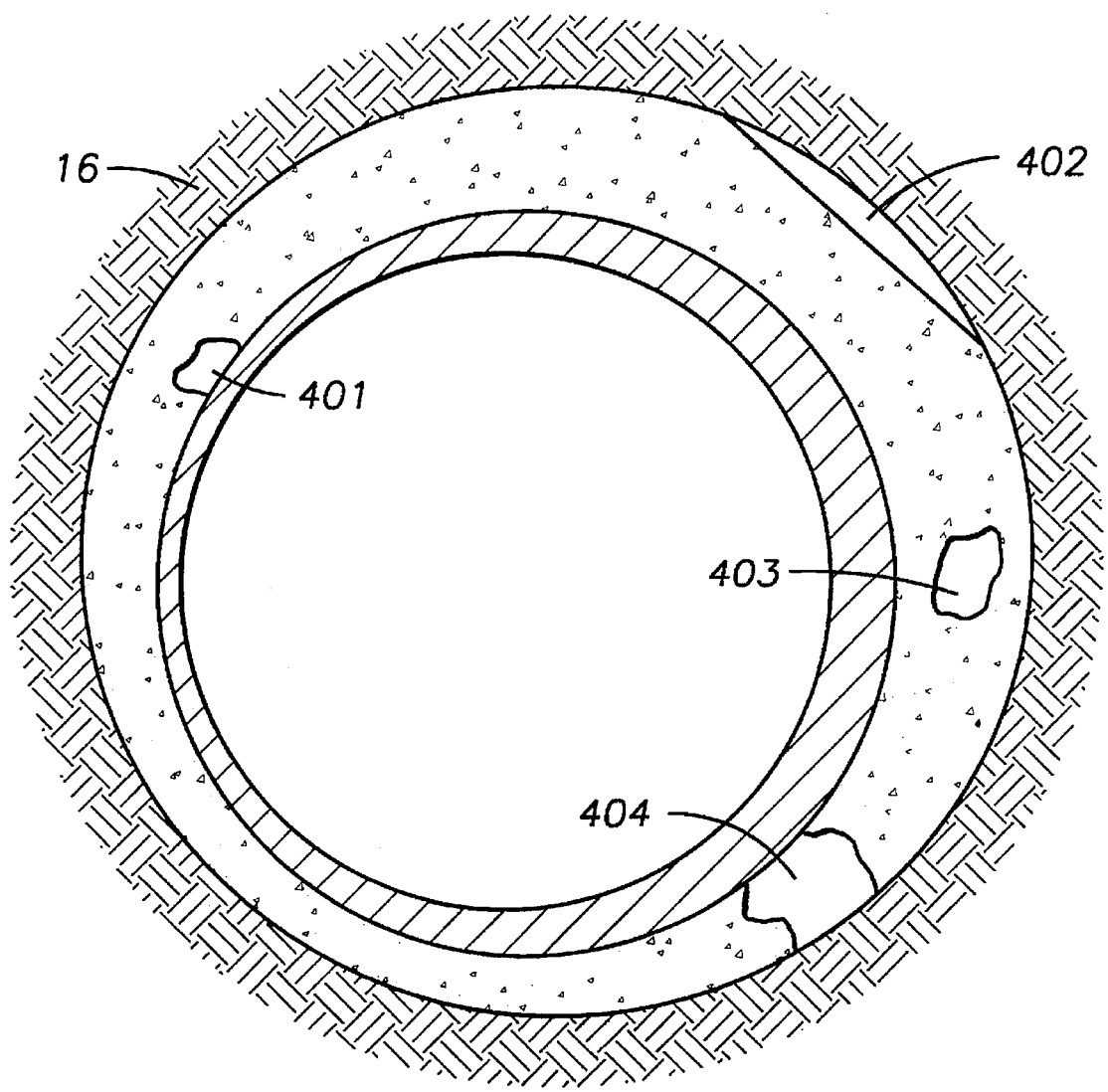
FIG. 6 shows various concrete defects which may degrade the ability of a system of this invention to log a formation.

FIG. 6 illustrates various concrete defects which may degrade the ability of the system to image the formation. Sections 401–404 in the concrete are either voids where the concrete is missing or are some form of particulate matter. More particularly, Section 401 is a void, filled with fluid of some kind. It will cause the first pulse reflection (or echo) after the first casing reflection (or echo) to be from the far wall of the void, rather than from the formation, and will result in inaccurate information about the formation at that point in the wellbore. The back wall of the void will add complexity to the reflected or echoed signal. Time information, however, will provide useful information about the geometry of the void.

Void 402 will similarly complicate the returning pulse reflection information due to reflection at the near wall of the void. Void 403 reflections can occur at both the near and far surfaces of the void. At void 404, the pulse reflection will be from the formation 16, provided that the void is filled with fluid, but the timing and reflectance amplitude information will be modified by the impedance and speed of the fluid contained within the void 404.

Because such voids can occur in fill material, acoustic pulse measurements are taken at multiple locations. Anomalies caused by the voids may then be more readily recognized for what they are, and the image of the formation may be better formed or approximated.

It will be apparent that various changes may be made in the details of construction of the system of this invention and the details of the performance of the method of this invention without departing from the spirit and scope of the invention as defined in the appended claims. It is therefore to be understood that this invention is not to be limited to the specific details shown and described.

I claim:

1. A method for logging a subterranean formation from a wellbore with casing and fill material penetrating said formation, comprising:

transmitting an acoustic pulse signal from a pulse-echo transducer into the wellbore at an angle approximately perpendicular to the wellbore;

receiving at the transducer a first casing echo at an angle approximately perpendicular to the wellbore;

receiving at the transducer a first formation echo at an angle approximately perpendicular to the wellbore;

detecting the amplitudes and times of arrival of the casing and formation echoes;

calculating the casing inner radius;

calculating the casing thickness;

calculating the fill material thickness;

calculating the formation reflectance amplitude; and using the formation reflectance amplitude to image the subterranean formation.

2. The method as defined in claim 1 wherein said step of calculating said casing thickness includes calculating a resonant frequency of said casing.

3. The method as defined in claim 2 wherein said step of calculating said fill material thickness includes determining an acoustic travel time through said casing and through said fill material, said acoustic travel time through said fill material being related to a difference in arrival time between said first casing echo and said first formation echo and to an acoustic travel time through said casing.

4. A method of imaging a subterranean formation using acoustic pulse-echo signals from an acoustic pulse-echo imaging instrument, said formation penetrated by a wellbore, said wellbore including a casing and cement therein, the method comprising:

determining amplitudes and first arrival times of echoes from said casing and said formation within said acoustic pulse-echo signals;

determining an inner radius of said casing;

determining a thickness of said casing;

determining a thickness of said cement;

determining a reflectance amplitude of said formation; and generating an image of said subterranean formation from said reflectance amplitude.

5. The method as defined in claim 4 wherein said step of determining said casing thickness includes calculating a resonant frequency of said casing.

6. The method as defined in claim 5 wherein said step of determining said thickness of said cement includes determining an acoustic travel time through said casing and through said cement, said acoustic travel time through said cement being related to a difference in said first arrival times between said casing echo and said formation echo and to an acoustic travel time through said casing.

* * * * *